(12) United States Patent
Sazawa et al.

(10) Patent No.: US 10,516,628 B2
(45) Date of Patent: Dec. 24, 2019

(54) TRANSFER DEVICE, TRANSFER SYSTEM, AND TRANSFER METHOD

(71) Applicant: FUJITSU LIMITED, Kawasaki-shi, Kanagawa (JP)

(72) Inventors: Shinichi Sazawa, Atsugi (JP); Hiroaki Kameyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/960,971

(22) Filed: Apr. 24, 2018

(65) Prior Publication Data

US 2018/0241700 A1 Aug. 23, 2018

Related U.S. Application Data

(63) Continuation of application No. PCT/JP2015/081909, filed on Nov. 12, 2015.

(51) Int. Cl.
*H04L 12/861* (2013.01)
*H04L 29/06* (2006.01)
*G06F 13/00* (2006.01)

(52) U.S. Cl.
CPC .......... *H04L 49/9057* (2013.01); *G06F 13/00* (2013.01); *H04L 69/22* (2013.01)

(58) Field of Classification Search
CPC ............................ H04L 49/9057; H04L 69/22
See application file for complete search history.

(56) References Cited

U.S. PATENT DOCUMENTS

2004/0215746 A1 10/2004 McCanne et al.
2012/0272286 A1* 10/2012 Pasternak .......... H04N 21/6379

FOREIGN PATENT DOCUMENTS

| JP | 2011-39899 | 2/2011 |
| JP | 2012-3652 | 1/2012 |
| JP | 2013-218505 | 10/2013 |

OTHER PUBLICATIONS

International Search Report, PCT/ISA/210, dated Feb. 2, 2016, in corresponding International Patent Application No. PCT/JP2015/081909.
International Written Opinion, PCT/ISA/237, dated Feb. 2, 2016, in corresponding International Patent Application No. PCT/JP2015/081909.
Japanese Office Action dated Jun. 11, 2019 in corresponding Japanese Patent Application No. 2017-549946.

* cited by examiner

*Primary Examiner* — Ronald B Abelson
(74) *Attorney, Agent, or Firm* — Staas & Halsey LLP

(57) ABSTRACT

A transfer device includes a memory and a processor configured to, when a plurality of packets are received from a client apparatus, register each of identifiers uniquely identifying each of the plurality of packets into sequence information in a reception order of the plurality of packets, when a first packet is received from the client apparatus, transmit the first packet to a destination apparatus and specify first identifier of a second packet next to the first packet in accordance with an order of the identifiers registered in the sequence information, and transmit the second packet corresponding to the specified first identifier to the destination apparatus.

15 Claims, 17 Drawing Sheets

FIG. 6

| ID | NON-DEPENDENT PARAMETER |
|---|---|
| xxx | open, param=1234 |
| yyy | getinfo, param=004 |
| zzz | read, from |
| ... | |

| | | 147 |
|---|---|---|
| REQUEST PACKET | RESPONSE PACKET | |
| REQUEST PACKET (open A param=1234) | RESPONSE PACKET (open A param=1234 OK) | |
| REQUEST PACKET (getinfo A param=004) | RESPONSE PACKET (getinfo A param=004 OK) | |
| REQUEST PACKET (read A from A) | RESPONSE PACKET (read A from A OK) | |
| ... | | |

TRANSFER DEVICE, TRANSFER SYSTEM, AND TRANSFER METHOD

CROSS-REFERENCE TO RELATED APPLICATION

This application is a continuation application of International Application PCT/JP2015/081909 filed on Nov. 12, 2015 and designated the U.S., the entire contents of which are incorporated herein by reference.

FIELD

The embodiments discussed herein are related to transfer techniques, and so on.

BACKGROUND

In recent years, there is a demand for faster data transfer speed on a wide area network (WAN) to respond to the business globalization, the aggregation of data centers to servers, and the spread of the cloud utilization and the mobile terminal.

Before describing a technique for achieving faster data transfer speed, an example of packet exchanges executed between a client and a server when reading a file is described. FIG. 16 is a diagram for illustrating Related Technique 1. A processing procedure of Related Technique 1 is based on the common internet file system (CIFS). As illustrated in FIG. 16, a client 10, when reading a file of a server 20, transmits request packets 10a to 10d and receives response packets 20a to 20d. The request packets 10a to 10d and the response packets 20a to 20d include, for example, various commands, parameters, and statuses.

For example, when reading a file A, the client 10 sequentially executes processing of transmitting the request packet 10a and then receiving the response packet 20a, and processing of transmitting the request packet 10b and then receiving the response packet 20b. Also, the client 10 executes processing of transmitting the request packet 10c and then receiving the response packet 20c.

When ending the reading of the file A, the client 10 executes processing of transmitting the request packet 10d and then receiving the response packet 20d.

As described with reference to FIG. 16, Related Technique 1 has a problem that a useless latency occurs due to the exchange of the request packet and response packet. For example, a round-trip time (RTT) taken until the client 10 ends the processing of reading the file A is expressed by Formula (1). In Formula (1), a RTT1 represents a time from when the client 10 transmits the request packet 10a until when the client 10 receives the response packet 20a. A RTT2 represents a time from when the client 10 transmits the request packet 10b until when the client 10 receives the response packet 20b. A RTT3 represents a time from when the client 10 transmits the request packet 10c until when the client 10 receives the response packet 20c. A RTT4 represents a time from when the client 10 transmits the request packet 10d until when the client 10 receives the response packet 20d.

$$RTT=RTT1+RTT2+RTT3+RTT4 \quad (1)$$

Next, Related Technique 2 for achieving faster data transfer is described. FIG. 17 is a diagram for illustrating Related Technique 2. As illustrated in FIG. 17, Related Technique 2 provides a dummy client 35 and a dummy server 45 between a client 30 and a server 40.

The dummy client 35 analyzes the CIFS protocol in advance and generates a sequence table 50. The sequence table 50 is a table configured to associate the request packet and a subsequent predicted packet with each other. The request packet is a request packet transmitted from the client 30. The subsequent predicted packet is a request packet predicted to be transmitted from the client 30 next to the request packet transmitted from the client 30.

For example, in the example indicated by the sequence table 50 of FIG. 17, a request packet including a command "open" and a parameter "1234" is associated with a subsequent predicted packet including a command "getinfo" and a parameter "004". Thus, when the request packet including the command "open" and the parameter "1234" is transmitted from the client 30, it may be predicted from the sequence table 50 that the request packet including the command "getinfo" and the parameter "004" is to be transmitted next.

Upon receiving a request packet from the client 30, the dummy client 35 compares the request packet to the sequence table 50 to identify the subsequent predicted packet. Upon identifying the subsequent predicted packet, the dummy client 35 transmits the subsequent predicted packet to the server 40 before receiving a next request packet from the client 30.

For example, in the example illustrated in FIG. 17, upon acquiring a request packet 30a from the client 30, the dummy client 35 transmits the request packet 30a and predicted packets 35a, 35b to the server 40. The predicted packet 35a is a request packet which is predicted from the request packet 30a, and the predicted packet 35b is a request packet which is predicted from the predicted packet 35a.

The request packet 30a and predicted packets 35a, 35b reach the server 40 via the dummy server 45. The server 40 transmits a response packet 40a corresponding to the request packet 30a, a response packet 40b corresponding to the predicted packet 35a, and a response packet 40c corresponding to the predicted packet 35b to the client 30.

The response packets 40a to 40c reach the dummy client 35 via the dummy server 45. The dummy client 35 transmits the response packet 40a corresponding to the received request packet 30a to the client 30. Thereafter, the dummy client 35, when receiving the request packet 30b from the client 30, transmits the response packet 40b to the client 30. The dummy client 35, when receiving the request packet 30c from the client 30, transmits the response packet 40c to the client 30.

As described with reference to FIG. 17, before receiving request packets 30b, 30c from the client 30, the dummy client 35 transmits predicted packets 35a, 35b to the server 40 in advance and receives the response packets 40b, 40c in advance. Execution of such processing allows the client 30 to receive response packets relative to the request packets 30b, 30c faster than Related Technique 1, and thereby reduction of the RTT is achieved.

For example, related techniques are disclosed in Japanese Laid-open Patent Publication Nos. 2011-039899 and 2013-218505.

SUMMARY

According to an aspect of the invention, a transfer device includes a memory and a processor configured to, when a plurality of packets are received from a client apparatus, register each of identifiers uniquely identifying each of the plurality of packets into sequence information in a reception order of the plurality of packets, when a first packet is received from the client apparatus, transmit the first packet to a destination apparatus and specify first identifier of a second packet next to the first packet in accordance with an order of the identifiers registered in the sequence information, and transmit the second packet corresponding to the specified first identifier to the destination apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example of the data structure of an ID table;

FIG. 7 illustrates an example of the data structure of a response table;

DESCRIPTION OF EMBODIMENTS

Conventional Techniques have a problem in that faster data transfer is not achieved. For example, when a request command registered in the sequence table 50 is received from the client 30, the technique according to Related Technique 2 achieves faster data transfer by transmitting a subsequent predicted packet to the server 40 in advance. However, when a request command not registered in the sequence table 50 is received from the client 30, the technique is unable to transmit the subsequent predicted packet to the server 40 in advance. Also, in general, communication protocols are upgraded at regular intervals. The upgrading changes the content of the request packet and the response packet, which causes an existing sequence table 50 to be no longer usable. Thus, faster data transfer is not achieved without updating the sequence table 50 in accordance with the upgrading.

Hereinafter, embodiments of a transfer device, a transfer system, a transfer method, and a transfer program according to the present disclosure are described in detail with reference to the accompanying drawings. However, the present disclosure is not limited to the embodiments.

First Embodiment

Figure 1:
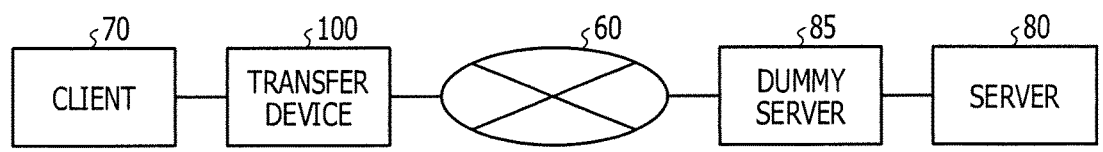
FIG. 1 illustrates the configuration of a system according to a first embodiment.

FIG. 1 illustrates the configuration of a system according to a first embodiment. As illustrated in FIG. 1, the system includes a client 70, a server 80, a dummy server 85, and a transfer device 100. The transfer device 100 is coupled to the client 70. The transfer device 100 is coupled to the dummy server 85 via a network 60 including a wide area network (WAN). The server 80 is coupled to the dummy server 85.

The client 70 is a device configured to access data stored in the server 80. When accessing data in the server 80, the client 70 transmits a request packet in accordance with a predetermined communication protocol and receives a response packet corresponding to the request packet from the server 80.

The dummy server 85 is a device configured to relay the request packet and the response packet transmitted and received between the transfer device 100 and the server 80.

The server 80 is a device configured to, upon receiving the request packet, generate a response packet corresponding to the request packet in accordance with the communication protocol and transmit the generated response packet to the client 70.

The transfer device 100 learns a transmission pattern of the request packet transmitted from the client 70 to the server 80 using a dynamic sequence table. The transfer device 100 predicts a packet following the request packet transmitted from the client 70 using the learnt dynamic sequence table, and transmits the predicted packet to the server 80 in advance.

Figure 2:
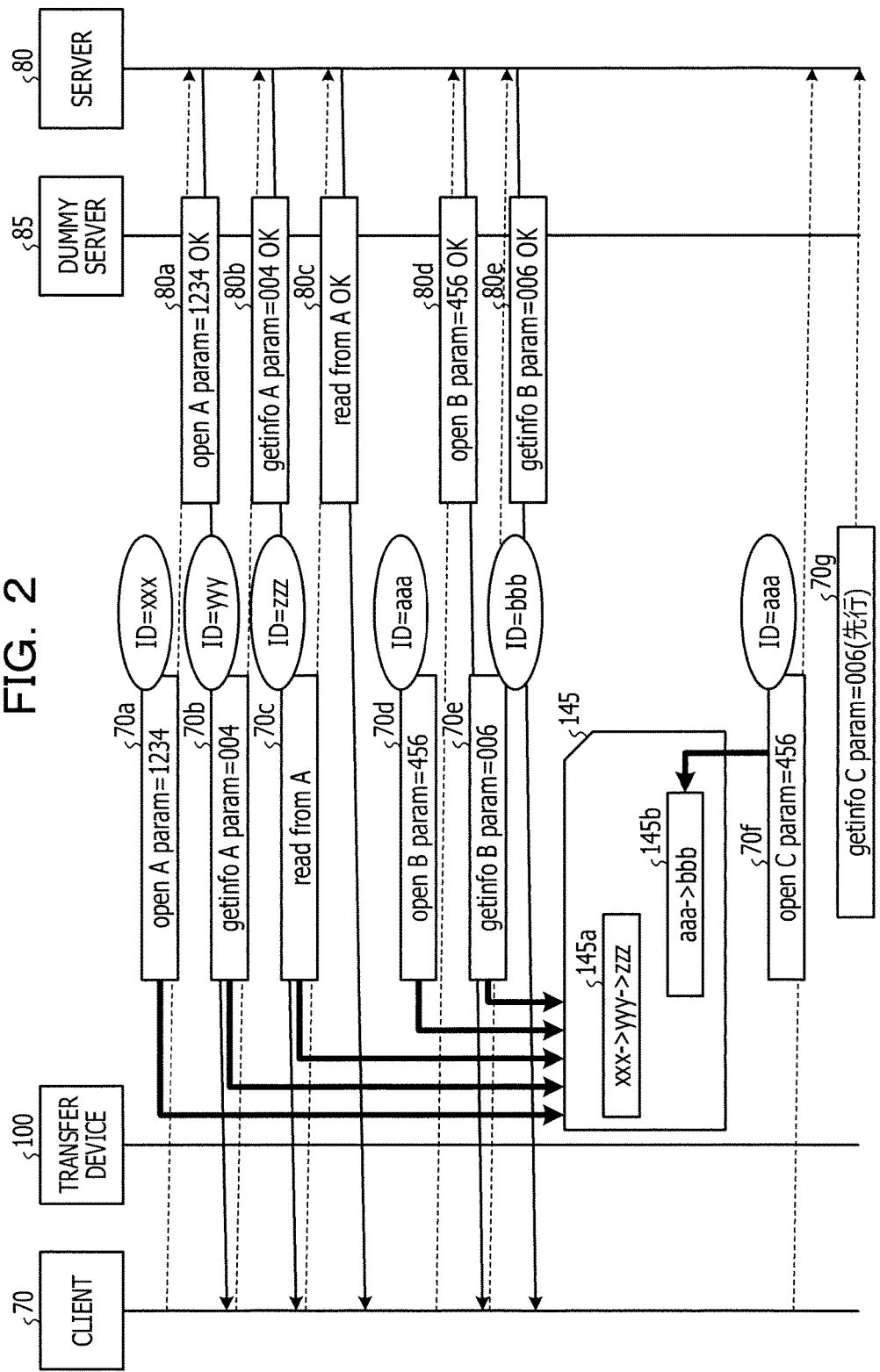
FIG. 2 is a diagram for illustrating processing of a transfer device according to the first embodiment.

Next, processing of the transfer device 100 according to the first embodiment is described. FIG. 2 is a diagram for illustrating the processing of the transfer device according to the first embodiment. As illustrated in FIG. 2, the transfer device 100 learns a transmission pattern of the request packet using the dynamic sequence table 145.

When learning the transmission pattern of the request packet, the transfer device 100 converts the request packet into the identification (ID). For example, the transfer device 100 separates the request packet into a parameter depending on a file and a parameter not depending on a file, and converts the request packet into the ID based on the parameter not depending on a file. In the description below, the parameter depending on the file is referred to as "dependent parameter", and the parameter not depending on the file is referred to as "non-dependent parameter".

The transfer device 100, when receiving request packets 70a, 70b, and 70c in this order from the client 70, transmits request packets 70a to 70c to the server 80. The transfer device 100 converts request packets 70a, 70b, and 70c respectively into IDs. The transfer device 100 arranges IDs based on the order of received request packets 70a to 70c, and thereby generates a transmission pattern 145a.

For example, the transfer device 100 converts the request packet 70a into an ID "xxx" based on the non-dependent parameter "open, param=1234" of the request packet 70a. The transfer device 100 converts the request packet 70b into an ID "yyy" based on the non-dependent parameter "getinfo, param=004" of the request packet 70b. The transfer device 100 converts the request packet 70b into an ID "zzz" based on the non-dependent parameter "read from" of the request packet 70c. The transfer device 100 arranges the IDs in the received order and thereby generates the transmission pattern 145a "xxx→yyy→zzz".

Request packets 70a to 70c reach the server 80 via the dummy server 85. The server 80 generates response packets 80a to 80c corresponding to request packets 70a to 70c, and transmits generated response packets 80a to 80c to the client 70.

The transfer device 100, when receiving a request packet from the client 70 after generating the transmission pattern 145a, transfers the received request packet to the server 80 and converts the request packet into an ID. When the converted ID is included in the transmission pattern 145a, the transfer device 100 generates a predicted packet based on the transmission pattern and transmits to the server 80. When the converted ID is not included in the transmission pattern 145a, the transfer device 100 generates a new transmission pattern 145a and executes processing of registering into the dynamic sequence table 145.

As an example, processing of the transfer device 100 which receives request packets 70d and 70e in this order from the client 70 is described. The transfer device 100 converts the request packet 70d into an ID "aaa" based on the non-dependent parameter "open, param=456" of the request packet 70d. Since the ID "aaa" is not included in the transmission pattern 145a, the transfer device 100 generates a new transmission pattern 145b. For example, assuming that the ID of the request packet 70e received next to the request packet 70d is "bbb", the transmission pattern 145b is "aaa→bbb".

The transfer device 100 transmits request packets 70d, 70e to the server 80. Request packets 70d, 70e reach the server 80 via the dummy server 85. The server 80 generates response packets 80d, 80e corresponding to request packets 70d, 70e, and transmits generated response packets 80d, 80e to the client 70.

Next, processing of the transfer device 100 which receives a request packet 70f after generating transmission patterns 145a, 145b from the client 70 is described. The transfer device 100 converts the request packet 70f into the ID "aaa" based on the non-dependent parameter "open, param=456" of the request packet 70f. Since the ID "aaa" is included in the transmission pattern 145b, the transfer device 100 generates a predicted packet based on the transmission pattern 145b.

For example, the ID next to the ID "aaa" of the transmission pattern 145b generated by the transfer device 100 is the ID "bbb". Thus, the transfer device generates a predicted packet 70g based on the ID "bbb". The transfer device 100 converts the ID "bbb" into a non-dependent parameter. For example, the non-dependent parameter corresponding to the ID "bbb" is "getinfo, param=006". The transfer device 100 combines a dependent parameter "C" included in the request packet 70f and the non-dependent parameter "getinfo, param=006" together, and thereby generates the predicted packet 70g. Before receiving a request packet next to the request packet 70f from the client 70, the transfer device 100 transmits the predicted packet 70g to the server 80 in advance.

Figure 3:
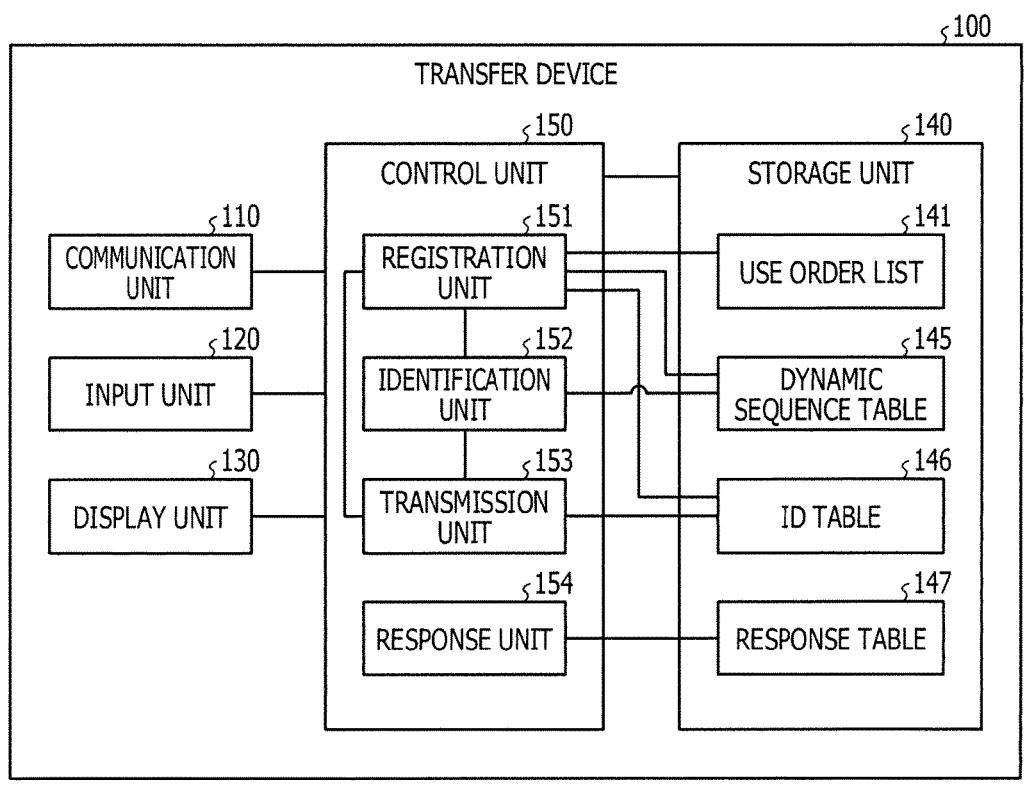
FIG. 3 is a functional block diagram illustrating the configuration of the transfer device according to the first embodiment.

Next, an example of the configuration of the transfer device 100 illustrated in FIGS. 1 and 2 is described. FIG. 3 is a functional block diagram illustrating the configuration of the transfer device according to the first embodiment. As illustrated in FIG. 3, the transfer device 100 includes a communication unit 110, an input unit 120, a display unit 130, a storage unit 140, and a control unit 150.

The communication unit 110 is a processor configured to execute data communication among the client 70, the server 80, and the dummy server 85. The control unit 150 described later exchanges data with the client 70, the server 80, and the dummy server 85 via the communication unit 110. The communication unit 110 corresponds to a communication device.

The input unit 120 is an input device configured to input various information into the transfer device 100. For example, the input unit 120 corresponds to, for example, a keyboard, a mouse, a touch panel, and an input button.

The display unit 130 is a display device configured to display various information outputted from the control unit 150. For example, the display unit 130 corresponds to, for example, a liquid crystal display and a touch panel.

The storage unit 140 includes a use order list 141, a dynamic sequence table 145, an ID table 146, and a response table 147. For example, the storage unit 140 corresponds to a semiconductor memory element including a random access memory (RAM), a read only memory (ROM), and a flash memory, and a storage device including a hard disk drive (HDD).

The use order list 141 is a list indicating the reception order of request packets received from the client 70 by the order of IDs corresponding to request packets. As described above, the ID is generated from the non-dependent parameter of the request packet.

Figure 4:
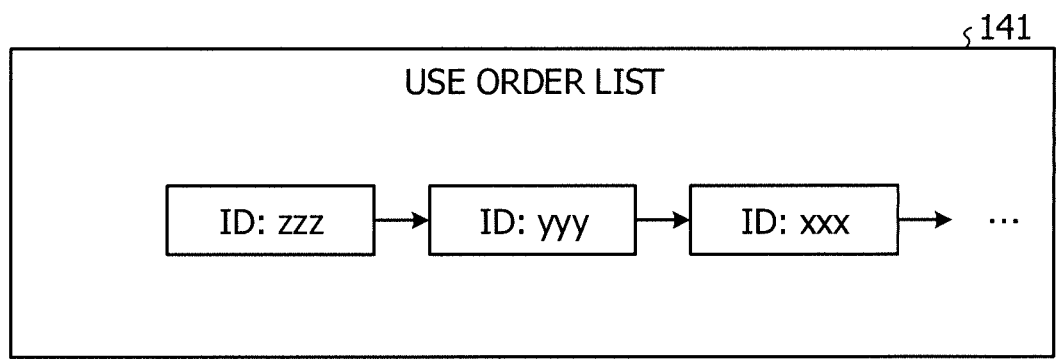
FIG. 4 illustrates an example of the data structure of a use order list.

FIG. 4 illustrates an example of the data structure of the use order list. The head ID stored in the use order list 141 is an ID corresponding to a last request packet received from the client 70. For example, as described with reference to FIG. 2, when the transfer device 100 receives request packets 70a, 70b, and 70c in this order from the client 70, IDs stored into the use order list 141 are "zzz, yyy, xxx" in the descending order from the head as illustrated in FIG. 4.

Figure 5:
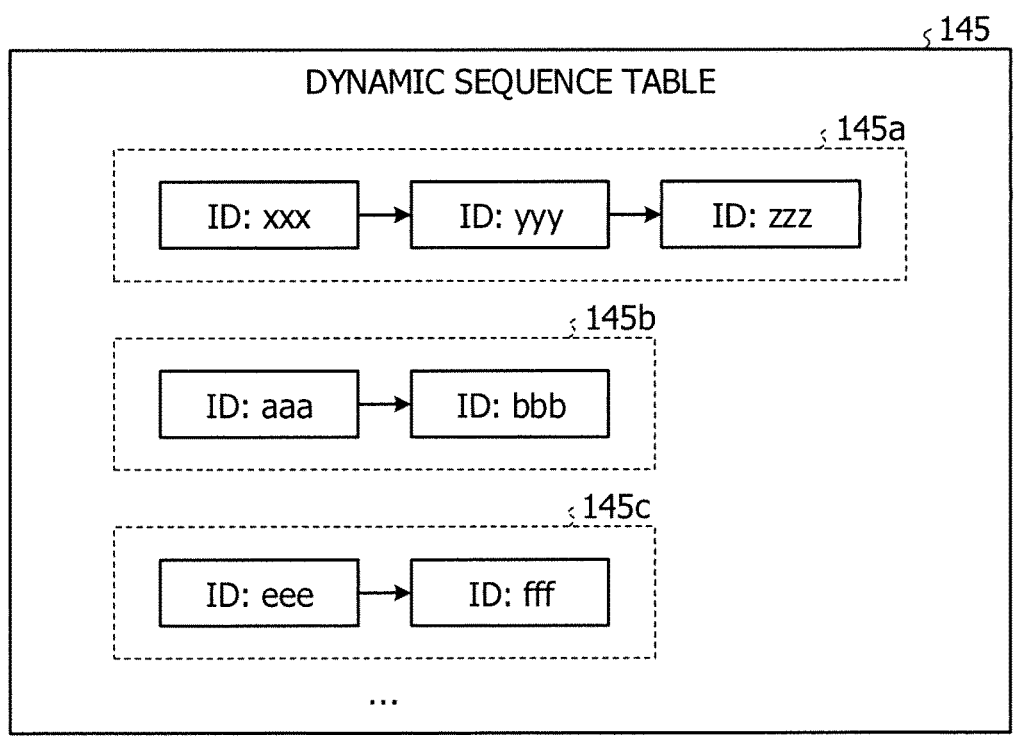
FIG. 5 illustrates an example of the data structure of a dynamic sequence table.

The dynamic sequence table 145 is a table configured to hold transmission patterns which are learning results of request packets in the transmission order transmitted from the client 70. FIG. 5 illustrates an example of the data structure of the dynamic sequence table. In the example illustrated in FIG. 5, the dynamic sequence table 145 stores transmission patterns 145a, 145b, 145c.

For example, the transmission pattern 145a registers IDs "xxx, yyy, zzz" in this order. Thus, this indicates that the client 70 transmits request packets in the order of a request packet corresponding to the ID "xxx", a request packet corresponding to the ID "yyy", and a request packet corresponding to the ID "zzz".

The transmission pattern 145b registers IDs "aaa, bbb" in this order. Thus, this indicates that the client 70 transmits request packets in the order of a request packet corresponding to the ID "aaa", and a request packet corresponding to the ID "bbb".

The transmission pattern 145c registers IDs "eee, fff" in this order. Thus, this indicates that the client 70 transmits request packets in the order of a request packet corresponding to the ID "eee", and a request packet corresponding to the ID "fff".

The ID table 146 is a table configured to associate the ID and the non-dependent parameter used when generating the ID, with each other. FIG. 6 illustrates an example of the data structure of the ID table. As illustrated in FIG. 6, the ID table 146 associates the ID and the non-dependent parameter with each other. For example, referring to the first line of the ID table 146, the ID "xxx" and the non-dependent parameter "open, param=1234" are associated with each other.

The response table 147 is a table configured to associate a request packet transmitted to the server 80 and a response packet transmitted from the server 80 relative to the request packet. FIG. 7 illustrates an example of the data structure of the response table. As illustrated in FIG. 7, the response table 147 associates the request packet and the response packet with each other. For example, the first line of the response table 147 indicates that the response packet corresponding to the request packet "open A param=1234" is "open A param=1234 OK".

The following describes by referring back to FIG. 3. The control unit 150 includes a registration unit 151, an identification unit 152, a transmission unit 153, and a response unit 154. The control unit 150 corresponds to an integrated device such as an application specific integrated circuit (ASIC) and a field programmable gate array (FPGA). The control unit 150 corresponds to, for example, an electronic circuit including a central processing unit (CPU) and a micro processing unit (MPU).

The registration unit 151 is a processor configured to, when a series of request packets are received from the client 70, register IDs corresponding to respective request packets into the dynamic sequence table 145. The following describes an example of processing of the registration unit 151.

Upon receiving a request packet from the client 70, the registration unit 151 separates the request packet into the dependent parameter and the non-dependent parameter, and generates the ID based on the non-dependent parameter. For example, the registration unit 151 determines the hash value of the non-dependent parameter using the hash function, and generates the ID of the request packet using the determined hash value. The registration unit 151 stores the ID and the non-dependent parameter into the ID table 146 while associating the ID and the non-dependent parameter with each other. Also, the registration unit 151 outputs the generated ID to the identification unit 152. The registration unit 151 outputs the dependent parameter of the request packet to the transmission unit 153.

The registration unit 151 compares the generated ID and the dynamic sequence table 145 with each other and performs processing based on the comparison result. Here, the processing which the registration unit 151 executes depending on the comparison result: a first pattern and a second pattern. Thus, the following describes the processing separately for the two patterns.

The first pattern is a pattern where an ID identical with the generated ID is registered in the dynamic sequence table 145, and there is a subsequent ID following the identical ID. For example, a pattern where the generated ID is "xxx", and the transmission patterns 145a in the dynamic sequence table 145 are "xxx→yyy→zzz" is the first pattern.

In the first pattern, an ID identical with the generated ID is registered in the use order list 141. The registration unit 151 moves the registered identical ID to the head to update the use order list 141. For example, when the generated ID is "xxx" and IDs registered in the use order list 141 are "zzz, yyy, xxx", the registration unit 151 rearranges the order of IDs in the use order list into "xxx, zzz, yyy".

The second pattern is a pattern where an ID identical with the generated ID is not registered in the dynamic sequence table 145. A pattern where an identical ID is registered in the dynamic sequence table 145 but there is no subsequent ID following the identical ID is also the second pattern.

In the second pattern, the registration unit 151 compares the ID generated from the request packet and the use order list 141 with each other. Then, when the generated ID is not registered in the use order list 141, the registration unit 151 newly registers the generated ID at the head of the use order list 141. For example, when the generated ID is "zzz" and IDs registered in the use order list 141 are "yyy, xxx", the registration unit 151 rearranges the order of IDs in the use order list 141 into "zzz, yyy, xxx".

The registration unit 151 sets the newly registered ID to the pre-transmission command in the use order list 141. When the pre-transmission command is already set to an ID in the use order list 141, the registration unit 151 identifies an ID next to an ID to which the pre-transmission command is set, as a newly registered ID and then sets the pre-transmission command to the newly registered ID. The registration unit 151 repeats execution of the above processing to identify the order of the ID, and sets the order of the identified ID into the dynamic sequence table 145 as a transmission pattern.

For example, in FIG. 4, when newly registered IDs are registered in the order of "xxx", "yyy", and "zzz" into the use order list 141, the pre-transmission command moves in the order of "xxx", "yyy", "zzz". In this case, "yyy" is the subsequent command of "xxx", and "zzz" is the subsequent command of "yyy". Thus, the registration unit 151 generates the transmission pattern 145a "xxx→yyy→zzz" and registers into the dynamic sequence table 145.

On the other hand, when the generated ID is registered in the use order list 141, the registration unit 151 moves a registered identical ID to the head to update the use order list 141. The registration unit 151 sets the ID moved to the head as the pre-transmission command. When the pre-transmission command is already set to an ID in the use order list 141, the registration unit 151 identifies an ID next to an ID to which the pre-transmission command is set, as an ID moved to the head, and then sets the pre-transmission command to the ID moved to the head. The registration unit 151 repeats execution of the above processing to identify the order of the ID, and sets the order of the identified ID into the dynamic sequence table 145 as a transmission pattern.

The registration unit 151 repeats execution of the processing of newly registering the generated ID into the use order list 141 or the processing of updating the use order list 141 to generate the transmission pattern. When the number of IDs registered in the use order list 141 exceeds the upper limit, the registration unit 151 deletes a last ID among IDs registered in the use order list 141.

In the meantime, when the request packet includes a subsequent prediction invalid command, the registration unit 151 skips the above processing and waits until receiving a next request packet. For example, the subsequent prediction invalid command is "close".

The following describes by referring back to FIG. 3. The identification unit 152 is a processor configured to, upon acquiring the ID corresponding to the request packet from the registration unit 151, compare the acquired ID and the dynamic sequence table 145 with each other and determine whether an ID identical with the acquired ID exists in the dynamic sequence table 145. When an ID identical with the acquired ID exists in the dynamic sequence table 145, the identification unit 152 identifies an ID next to this ID and outputs the identified ID to the transmission unit 153. When the identified ID is further followed by another ID, the identification unit 152 outputs subsequent IDs in order to the transmission unit 153.

As an example, the processing of the identification unit 152 is described below assuming that the ID corresponding to the request packet acquired from the registration unit 151 is "xxx". The identification unit 152 compares the ID "xxx" and the dynamic sequence table 145 of FIG. 5 with each other and determines that the ID "xxx" exists in the transmission pattern 145*a*. The identification unit 152 outputs the ID "yyy" next to the ID "xxx" registered in the transmission pattern 145*a* to the transmission unit 153. The identification unit 152 also outputs the ID "zzz" next to the ID "yyy" to the transmission unit 153. Thus, the identification unit outputs IDs in the order of the ID "yyy" and the ID "zzz" to the transmission unit 153.

The transmission unit 153 is a processor configured to generate the predicted packet based on the ID acquired from the identification unit 152 and transmit the generated predicted packet to the server 80. The transmission unit 153 receives the request packet from the client 70. Then, if a predicted packet identical with the received request packet is not transmitted to the server 80, the transmission unit 153 transmits the request packet to the server 80. The following describes an example of the processing procedure of the transmission unit 153.

The transmission unit 153 compares the ID acquired from the identification unit 152 and the ID table 146 with each other and acquires a non-dependent parameter corresponding to the ID. The transmission unit 153 also acquires a dependent parameter of the request parameter from the registration unit 151. The transmission unit 153 combines the non-dependent parameter and the dependent parameter together to generate a predicted packet.

As an example, the following describes processing in which the transmission unit 153 acquires the ID "yyy" from the identification unit 152 and acquires the dependent parameter "A" from the registration unit 151. The identification unit 152 compares the ID "yyy" and the ID table 146 with each other to acquire the non-dependent parameter "getinfo, param=004" corresponding to the ID "yyy". The transmission unit 153 combines the dependent parameter "A" and the non-dependent parameter "getinfo, param=004" together to generate the predicted packet "getinfo A param=004", and transmits the generated predicted packet to the server 80.

The response unit 154 is a processor configured to associate a request packet or a predicted packet transmitted from the transfer device 100 to the server 80 and a response packet corresponding to the request packet or the predicted packet with each other and register into the response table 147. In the below description of the response unit 154, the request packet and the predicted packet are collectively described as the request packet for the convenience of description, without separating from each other.

The response unit 154, when receiving the request packet from the client 70, compares the received request packet and the response table 147 with each other and determines whether a request packet identical with the request packet is registered in the response table 147. When a request packet identical with the request packet is registered in the response table 147, the response unit 154 transmits a corresponding packet to the client 70.

As an example, the following describes processing of the response unit 154 when the request packet "getinfo A param=004" is received from the client 70, with reference to FIG. 7. The response unit 154 compares the request packet "getinfo A param=004" and the response table 147 with each other to identify the response packet "getinfo A param=004 OK" corresponding to the request packet "getinfo A param=004". The response unit 154 transmits the response packet "getinfo A param=004 OK" to the client 70.

Figure 8:
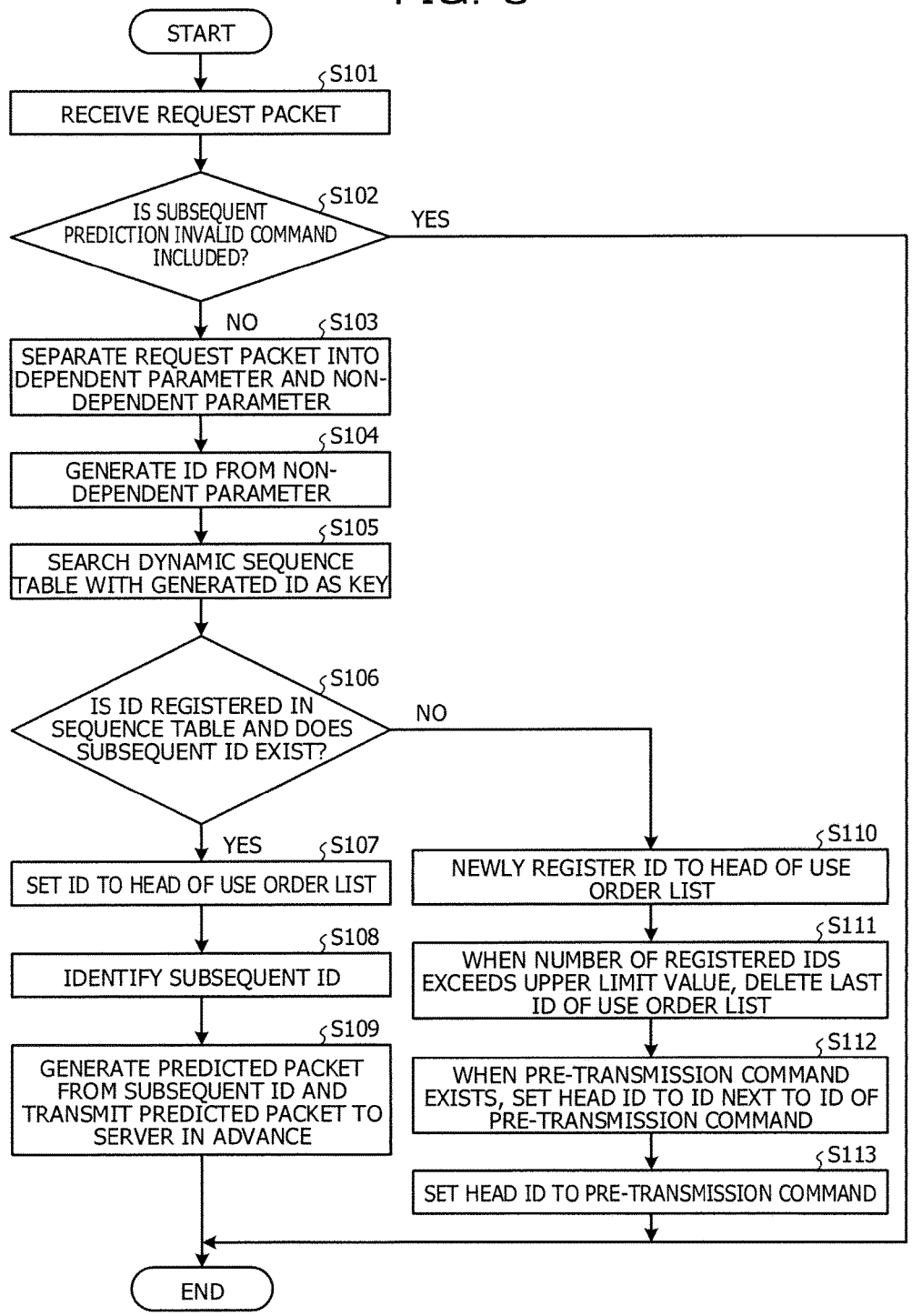
FIG. 8 is a flowchart illustrating a processing procedure of the transfer device according to the first embodiment.

Next, an example of a processing procedure of the transfer device 100 according to the first embodiment is described. FIG. 8 is a flowchart illustrating a processing procedure of the transfer device according to the first embodiment. As illustrated in FIG. 8, the registration unit 151 of the transfer device 100 receives the request packet from the client 70 (step S101). When the request packet includes the subsequent prediction invalid command (step S102: Yes), the registration unit 151 ends the processing. On the other hand, when the subsequent prediction invalid command is not included in the request packet (step S102: No), the registration unit 151 shifts to the step S103.

The registration unit 151 separates the request packet into the dependent parameter and the non-dependent parameter (step S103) and generates the ID from the non-dependent parameter (step S104). The registration unit 151 searches the dynamic sequence table 145 with the generated ID as a key (step S105).

When the ID is registered in the dynamic sequence table 145 and a subsequent ID exists (step S106: Yes), the registration unit 151 shifts to the step S107. On the other hand, when the ID is not registered in the dynamic sequence table 145 or when a subsequent ID does not exist (step S106: No), the registration unit 151 shifts to the step S110.

The following describes step S107 and subsequent steps. The registration unit 151 sets the ID to the head of the use order list 141 (step S107). The identification unit 152 of the transfer device 100 identifies the subsequent ID based on the dynamic sequence table 145 (step S108). The transmission unit 153 of the transfer device 100 generates the predicted packet from the subsequent ID and transmits the predicted packet to the server 80 in advance (step S109).

The following describes step S110 and subsequent steps. The registration unit 151 newly registers the ID to the head of the use order list 141 (step S110). When the number of registered IDs in the use order list 141 exceeds the upper limit value, the registration unit 151 deletes a last ID in the use order list 141 (step S111).

When the pre-transmission command exists, the registration unit 151 sets the head ID to an ID next to the ID of the pre-transmission command (step S112). The registration unit 151 sets the head ID to the pre-transmission command (step S113).

Next, effects of the transfer device 100 according to the first embodiment are described. As described above, the transfer device 100 learns a transmission pattern of the request packet transmitted from the client 70 to the server 80 using the dynamic sequence table 145. Then, the transfer device 100 predicts a packet following the request packet transmitted from the client 70 using the learnt dynamic sequence table 145, and transmits the predicted packet to the server 80 in advance. This achieves faster data transfer.

For example, the transfer device 100, when receiving the request packet, transmits a subsequent request packet to the server 80 in advance and receives the response packet. Thus, upon receiving the subsequent request packet from the client 70, the transfer device 100 may transmit the response packet received in advance to the client 70 and thereby reduce the RTT.

The transfer device 100 executes the processing of dynamically registering the transmission pattern into the dynamic sequence table 145. Thus, even when the communication protocol is upgraded, a change of the transmission patter according to the upgrading may be reflected on the dynamic sequence table 145 and thereby faster data transfer may be achieved even after the upgrading.

The transfer device 100 generates the ID based on the non-dependent parameter among commands included in the request packet and learns the transmission order of the request packet. Thus, even when a request packet including an identical non-dependent parameter and a different dependent parameter, the transfer device 100 may predict the subsequent request packet.

Second Embodiment

Figure 9:
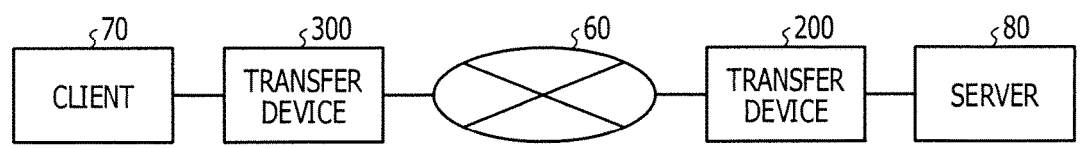
FIG. 9 illustrates the configuration of a system according to a second embodiment.

Next, a system according to a second embodiment is described. FIG. 9 illustrates the configuration of a system according to the second embodiment. As illustrated in FIG. 9, the system includes a client 70, a server 80, a transfer device 200, and a transfer device 300. The client 70 is coupled to the transfer device 300. Transfer devices 200, 300 are coupled with each other via a network 60. The transfer device 200 is coupled to the server 80. Among those components, description of the client 70 and the server 80 is omitted as being the same as the client 70 and the server 80 illustrated in FIG. 1.

The transfer device 200 learns a transmission pattern of the request packet transmitted from the client 70 to the server 80 using a dynamic sequence table. The transfer device 200 predicts a packet following the request packet transmitted from the client 70 using the learnt dynamic sequence table, and transmits the predicted packet to the server 80 in advance.

The transfer device 200 generates a response table which associates the request packet transmitted to the server 80 and a response packet corresponding to the request packet with each other, and transmits the generated response table to the transfer device 300.

The transfer device 300, when receiving the request packet transmitted from the client 70 to the server 80, transfers the received request packet to the server 80. The transfer device 300, when receiving a response table from the transfer device 200, transmits a response packet corresponding to the request packet transmitted from the client 70 to the client 70 based on the response table.

Figure 10:
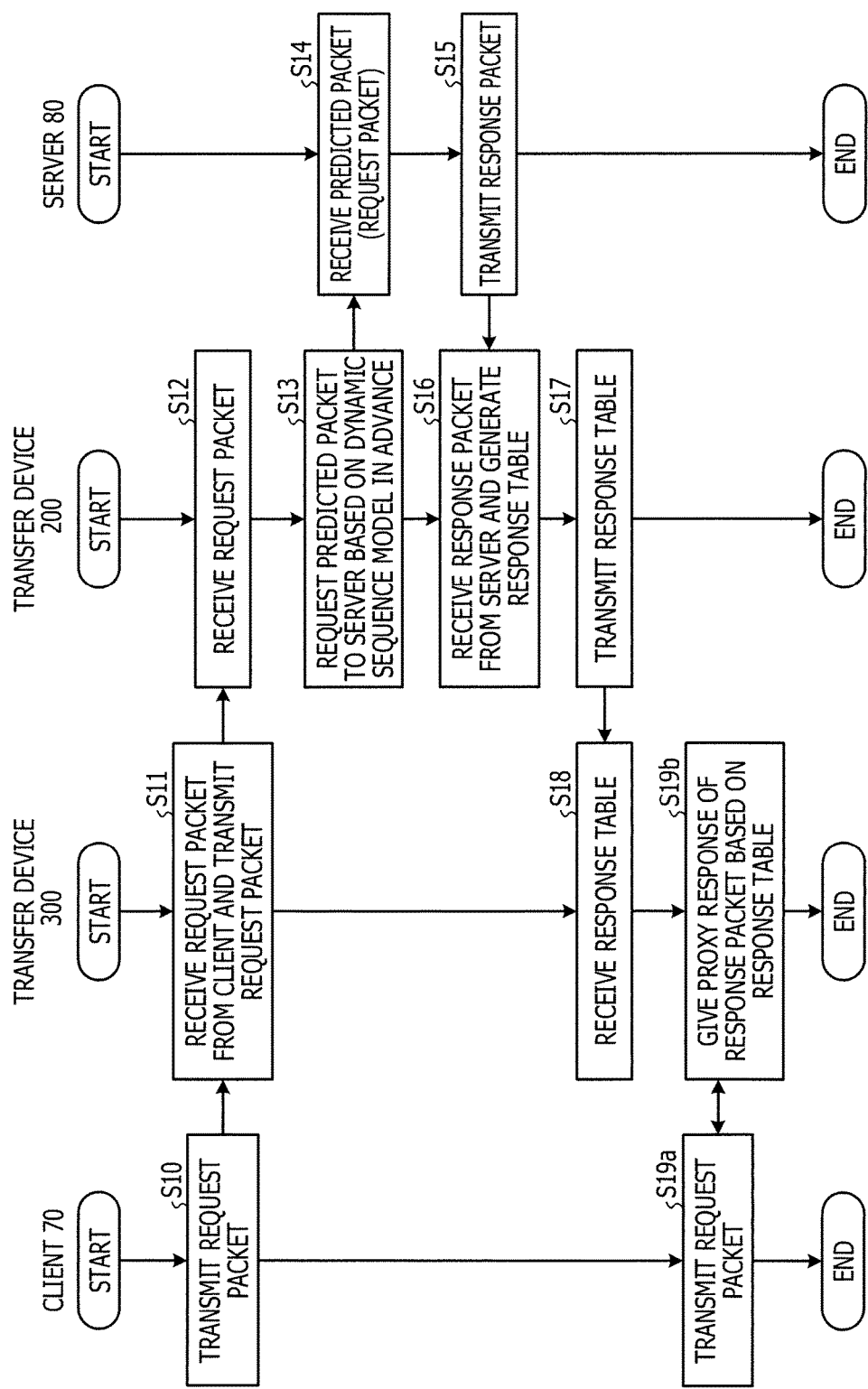
FIG. 10 is a diagram for illustrating processing of transfer devices according to the second embodiment.

Next, an example of processing of transfer devices 200, 300 according to the second embodiment is described. FIG. 10 is a diagram for illustrating processing of transfer devices according to the second embodiment. As illustrated in FIG. 10, the client 70 transmits the request packet to the transfer device 300 (step S10). The transfer device 300 receives the request packet from the client 70 and transmits the request packet to the transfer device 200 (step S11).

The transfer device 300 receives the request packet from the transfer device 200 (step S12). The transfer device 300 transmits the predicted packet based on a dynamic sequence model to the server 80 in advance (step S13). In the same manner as the transfer device 100 described in the first embodiment, the transfer device 300 generates the dynamic sequence model.

The server 80 receives the predicted packet (step S14). The server 80 transmits the response packet to the transfer device 200 (step S15). The transfer device 200 receives the response packet from the server 80 and generates a response table which associates the request packet and the response packet with each other (step S16). For example, the transfer device 200, which has transmitted a plurality of predicted packets to the server 80 in the step S13, receives response packets corresponding to predicted packets from the server 80 in the step S16.

The transfer device 200 transmits the response table to the transfer device 300 (step S17). The transfer device 300 receives the response table (step S18). The client 70 transmits the request packet (step S19a), and the transfer device 300 gives a proxy response of the request packet based on the response table (step S19b).

Figure 11:
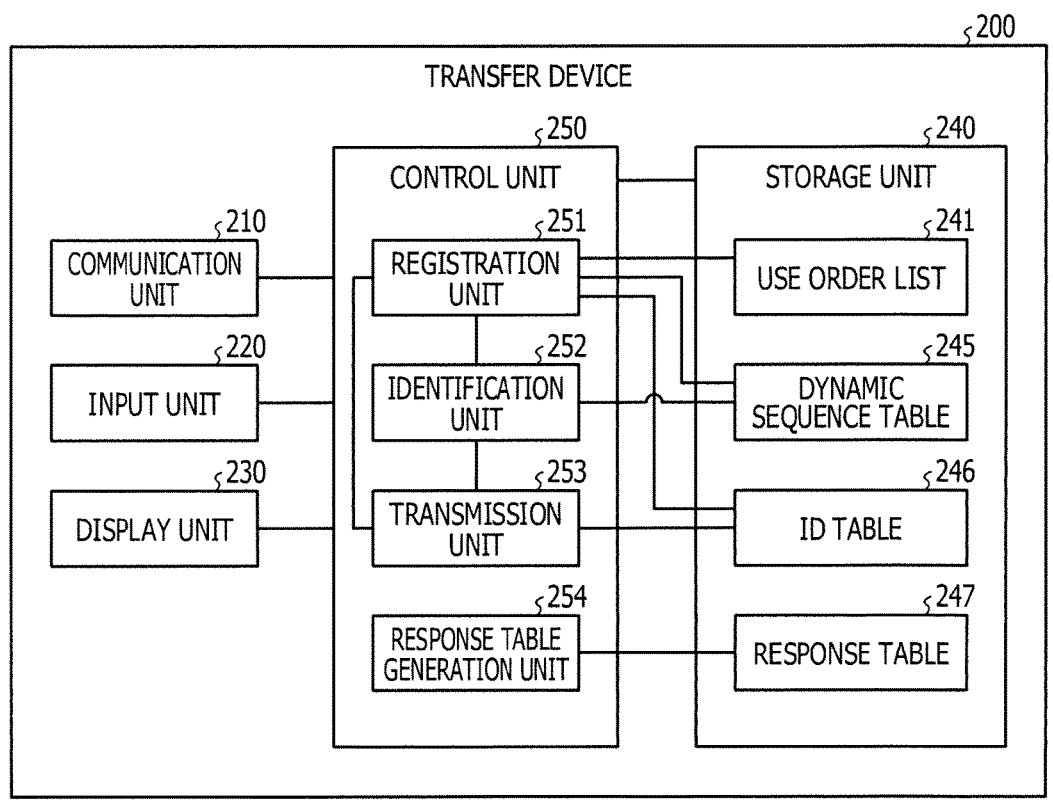
FIG. 11 is a functional block diagram (part 1) illustrating the configuration of a transfer device according to the second embodiment.

Next, an example of the configuration of the transfer device 200 illustrated in FIGS. 9 and 10 is described. FIG. 11 is a functional block diagram (part 1) illustrating the configuration of a transfer device according to the second embodiment. As illustrated in FIG. 9, the transfer device 200 includes a communication unit 210, an input unit 220, a display unit 230, a storage unit 240, and a control unit 250.

The communication unit 210 is a processor configured to execute data communication among the client 70, the server 80, and the transfer device 300. The control unit 250 described later exchanges data with the client 70, the server 80, and the transfer device 300 via the communication unit 210. The communication unit 210 corresponds to a communication device.

Description of the input unit 220 and the display unit 230 is the same as description of the input unit 120 and the display unit 130 described with reference to FIG. 3.

The storage unit 240 includes a use order list 241, a dynamic sequence table 245, an ID table, and a response table 247. The storage unit 240 corresponds to a semiconductor memory element such as a RAM, a ROM, and a flash memory, and a storage device such as a HDD.

The use order list 241 is a list indicating the reception order of request packets received from the client 70 by the order of IDs corresponding to request packets. In the same manner as in the first embodiment, the ID corresponding to the request packet is generated from the non-dependent parameter of the request packet. Data structure of the use order list 241 is the same as the data structure of the use order list 141 described with reference to FIG. 4.

The dynamic sequence table 245 is a table configured to hold transmission patterns which are learning results of request packets in the transmission order transmitted from the client 70. Data structure of the dynamic sequence table 245 is the same as the dynamic sequence table 145 described with reference to FIG. 5.

The ID table 246 is a table configured to associate the ID and the non-dependent parameter used when generating the ID, with each other. Data structure of the ID table is the same as the data structure of the ID table 146 described with reference to FIG. 6.

The response table 247 is a table configured to associate a request packet transmitted to the server 80 and a response packet transmitted from the server 80 relative to the request packet. Data structure of the response table 247 is the same as the data structure of the response table 147 described with reference to FIG. 7.

The control unit 250 includes a registration unit 251, an identification unit 252, a transmission unit 253, and a response table generation unit 254. The control unit 250 corresponds to an integrated device such as an ASIC and a FPGA. The control unit 250 corresponds to, for example, an electronic circuit such as a CPU and a MPU.

The registration unit 251 is a processor configured to, when a series of request packets are received from the client 70, register IDs corresponding to respective request packets into the dynamic sequence table 245 in the reception order of the series of request packets. The registration unit 251 updates the use order list 241 based on the ID of the request packet and outputs the ID of the request packet to the identification unit 252. The registration unit 251 outputs the dependent parameter of the request packet to the transmission unit 253. Description of the specific processing of the registration unit 251 is omitted as being the same as the processing of the registration unit 151 illustrated in FIG. 3.

The identification unit 252 is a processor configured to, upon acquiring the ID corresponding to the request packet from the registration unit 251, compare the acquired ID and the dynamic sequence table 245 with each other and determine whether an ID identical with the acquired ID exists in the dynamic sequence table 245. When an ID identical with the acquired ID exists in the dynamic sequence table 245, the identification unit 252 identifies an ID next to this ID and outputs the identified ID to the transmission unit 253. When the identified ID is further followed by another ID, the identification unit 252 outputs subsequent IDs in order to the transmission unit 253.

The transmission unit 253 is a processor configured to generate the predicted packet based on the ID acquired from the identification unit 252 and transmit the generated predicted packet to the server 80. The transmission unit 253 receives the request packet from the client 70. Then, if a predicted packet identical with the received request packet is not transmitted to the server 80, the transmission unit 253 transmits the request packet to the server 80. Description of the specific processing of the transmission unit 253 is omitted as being the same as the processing of the transmission unit 153 illustrated in FIG. 3.

The response table generation unit 254 is a processor configured to associate a request packet or a predicted packet transmitted from the transfer device 200 to the server 80 and a response packet corresponding to the request packet or the predicted packet with each other and register into the response table 247. The response table 254 transmits the generated response table 247 to the transfer device 300. In the below description of the response table generation unit 254, the request packet and the predicted packet are collectively described as the request packet for the convenience of description without separating from each other.

The response table generation unit 254 waits until the transfer device 200 transmits a last request packet to the server 80 and receives a response packet corresponding to the last transmitted request packet, and then transmits the response table 247 to the transfer device 300. The response table generation unit 254 may transmit the response table 247 to the transfer device 300 for every predetermined cycle.

Figure 12:
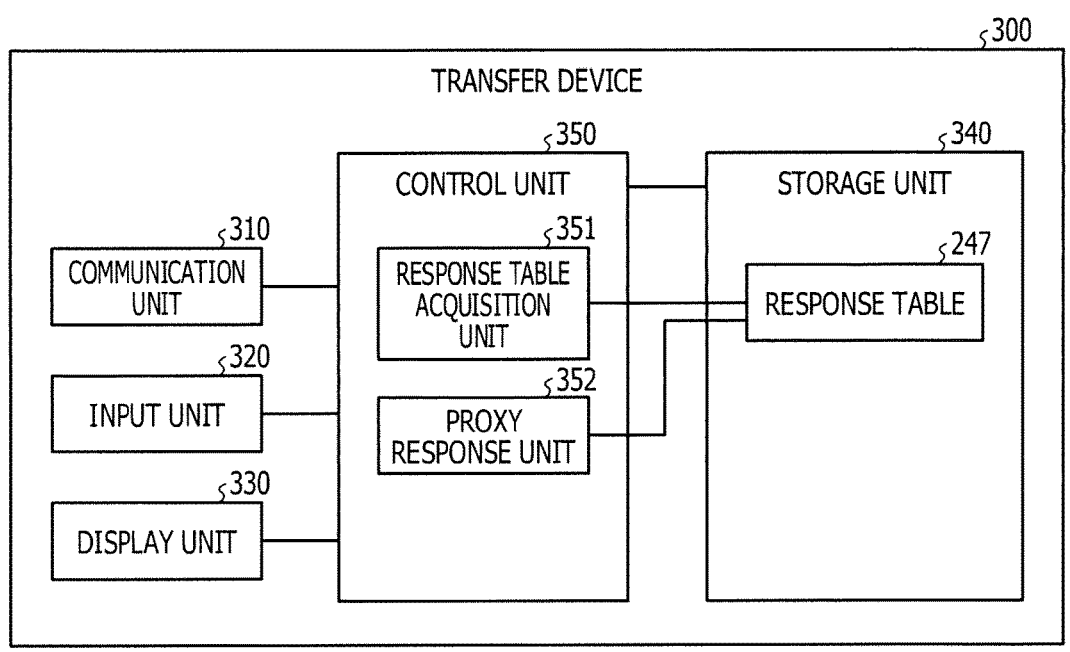
FIG. 12 is a functional block diagram (part 2) illustrating the configuration of a transfer device according to the second embodiment.

Next, an example of the configuration of the transfer device 300 illustrated in FIGS. 9 and 10 is described. FIG. 12 is a functional block diagram (part 2) illustrating the configuration of a transfer device according to the second embodiment. As illustrated in FIG. 12, the transfer device 300 includes a response table acquisition unit 351 and a proxy response unit 352.

The communication unit 310 is a processor configured to execute data communication among the client 70, the server 80, and the transfer device 200. The control unit 350 described later exchanges data with the client 70, the server 80, and the transfer device 200 via the communication unit 310. The communication unit 310 corresponds to a communication device.

Description of the input unit 320 and the display unit 330 is the same as the input unit 120 and the display unit 130 described with reference to FIG. 3.

The storage unit 340 includes a response table 247. The storage unit 340 corresponds to a semiconductor memory element such as a RAM, a ROM, and a flash memory, and a storage device such as a HDD.

The response table 247 is a response table transmitted from the transfer device 200. Description of the response table 247 is the same as the description of the response table 247 described above.

The control unit 350 includes a response table acquisition unit 351 and a proxy response unit 352. The control unit 350 corresponds to an integrated device such as an ASIC and a FPGA. The control unit 350 corresponds to, for example, an electronic circuit such as a CPU and a MPU.

The response table acquisition unit 351 is a processor configured to acquire the response table 247 from the transfer device 200. The response table acquisition unit 351 stores the acquired response table 247 into the storage unit 340.

The proxy response unit 352 is a processor configured to, when a request packet is received from the client 70, search a response packet corresponding to the request packet based on the response table 247, and transmits the response packet to the client 70. When a response packet corresponding to the request packet is not registered in the response table 247, the proxy response unit 352 transmits the request packet to the transfer device 200.

Figure 13:
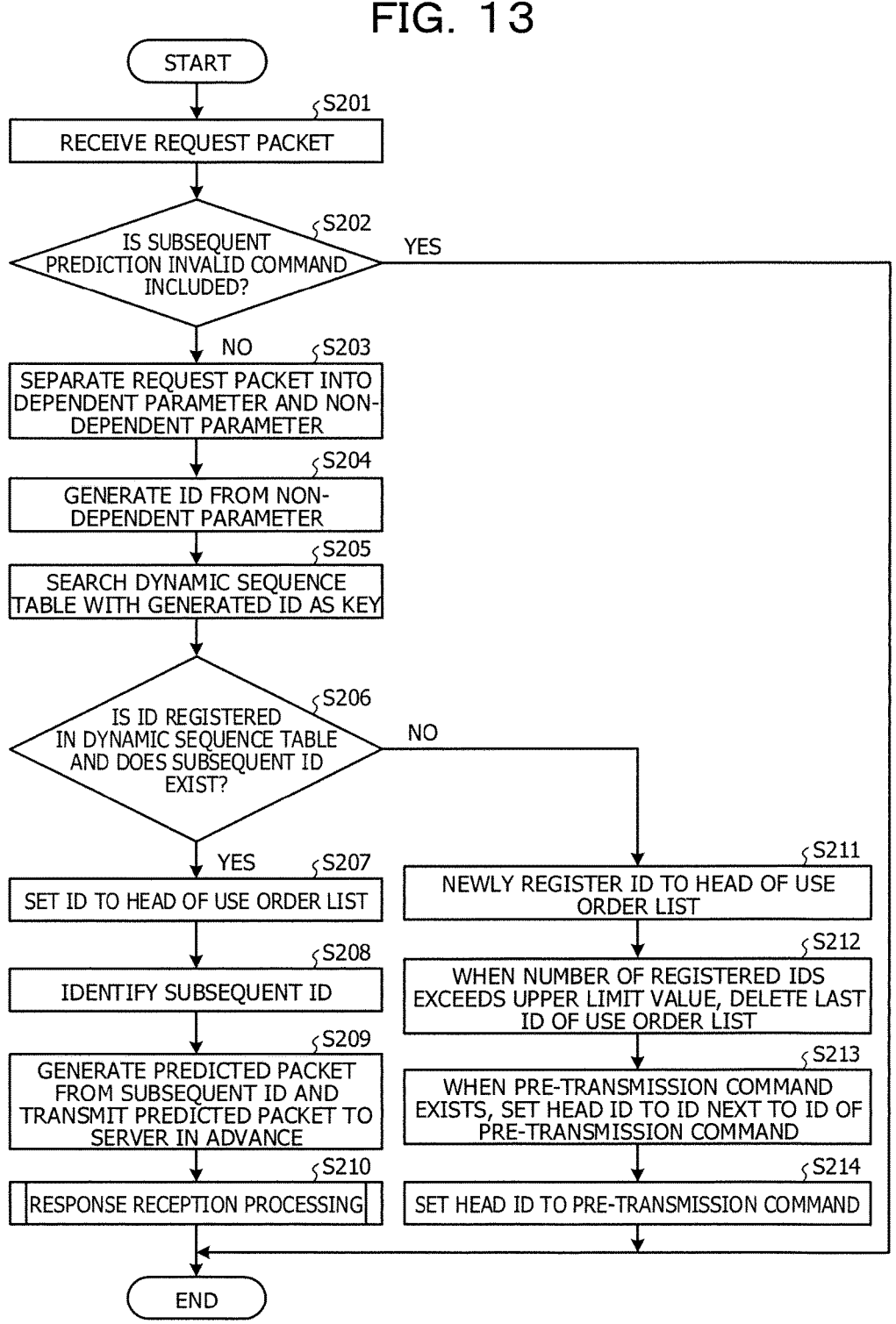
FIG. 13 is a flowchart illustrating a processing procedure of the transfer device according to the second embodiment.

Next, a processing procedure of the transfer device 200 according to the second embodiment is described. FIG. 13 is a flowchart illustrating a processing procedure of the transfer device according to the second embodiment. As illustrated in FIG. 13, the registration unit 251 of the transfer device 200 receives the request packet from the client 70 (step S201). When the request packet includes the subsequent prediction invalid command (step S202: Yes), the registration unit 151 ends the processing. On the other hand, when the subsequent prediction invalid command is not included in the request packet (step S202: No), the registration unit 251 shifts to the step S203.

The registration unit 251 separates the request packet into the dependent parameter and the non-dependent parameter (step S203) and generates the ID from the non-dependent parameter (step S204). The registration unit 251 searches the dynamic sequence table 245 with the generated ID as a key (step S205).

When the ID is registered in the dynamic sequence table 245 and a subsequent ID exists (step S206: Yes), the registration unit 251 shifts to the step S207. On the other hand, when the ID is not registered in the dynamic sequence table 245 or a subsequent ID does not exist (step S206: No), the registration unit 251 shifts to the step S211.

The following describes step S207 and subsequent steps. The registration unit 251 sets the ID to the head of the use order list 241 (step S207). The identification unit 252 of the transfer device 200 identifies the subsequent ID based on the dynamic sequence table 245 (step S208). The transmission unit 253 of the transfer device 200 generates the predicted packet from the subsequent ID and transmits the predicted packet to the server 80 in advance (step S209). The response table generation unit 254 of the transfer device 200 executes the response reception processing (step S210) and ends the processing.

The following describes step S211 and subsequent steps. The registration unit 251 newly registers the ID to the head of the use order list 241 (step S211). When the number of registered IDs in the use order list 241 exceeds the upper limit value, the registration unit 251 deletes a last ID in the use order list 241 (step S212).

When the pre-transmission command exists, the registration unit 251 sets the head ID to an ID next to the ID of the pre-transmission command (step S213). The registration unit 251 sets the head ID to the pre-transmission command (step S214).

Figure 14:
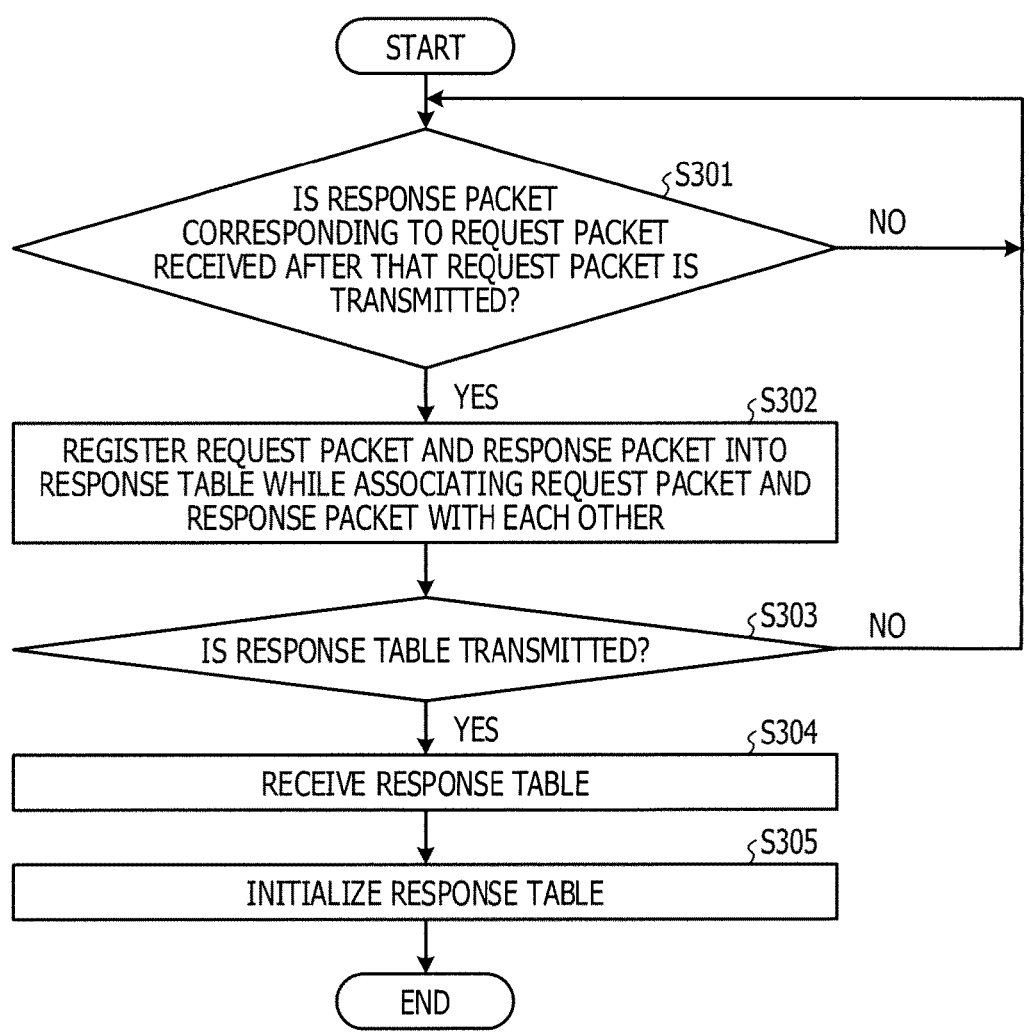
FIG. 14 is a flowchart illustrating a processing procedure of a response reception processing.

Next, the response reception processing illustrated in the step S210 of FIG. 13 is described. FIG. 14 is a flowchart illustrating a processing procedure of the response reception processing. As illustrated in FIG. 14, when a response packet corresponding to the transmitted request packet is not received after the request packet is transmitted (step S301: No), the response table generation unit 254 of the transfer device 200 shifts to the step S301 again.

When a response packet corresponding to the transmitted request packet is received after the request packet is transmitted (step S301: Yes), the response table generation unit 254 shifts to the step S302. The response table generation unit 254 registers the request packet and the response packet into the response table 247 while associating the request packet and the response packet with each other (step S302).

When not transmitting the response table 247 (step S303: No), the response table generation unit 254 shifts to the step S301. On the other hand, when transmitting the response table 247 (step S303: Yes), the response table generation unit 254 transmits the response table 247 to the transfer device 300 (step S304). The response table generation unit 254 initializes the response table 247 (step S305).

Next, effects of transfer devices 200, 300 according to the second embodiment are described. The transfer device 200 transmits a predicted packet following the request packet transmitted from the client 70 to the server 80 in advance, and notifies the response packet corresponding to the request packet to the transfer device 300. Thus, when the request packet transmitted from the client 70 reaches the transfer device 300, the response packet acquired in advance may be notified to the client 70 and thereby faster data transfer may be achieved.

Although configurations of transfer devices 200, 300 are described separately, a transfer device including a function integrating configurations of the transfer device 200 and the transfer device 300 may be arranged in place of transfer devices 200, 300.

Next, the processing content of transfer devices 100, 200, 300 described above is an example, and transfer devices 100, 200, 300 may execute other processing. Hereinafter, other processing (1) to (3) of transfer devices 100, 200, 300 are described.

The following describes the other processing (1) of the transfer device 200. The transfer device 200 predicts a next predicted packet of the request packet using, for example, the transmission pattern 145a illustrated in FIG. 5, but it is not limited thereto. For example, the transfer device 200 may add a response packet from the server 80 to a transmission pattern to generate the transmission pattern and generate the predicted packet. For example, the transfer device 200 may generate the following transmission pattern.

Transmission pattern: ID "xxx"→ID "XXX"→ID "yyy".

A first transmission pattern is a transmission pattern in which when the client 70 transmits a request packet of the ID "xxx" to the server 80, the server 80 transmits a response packet of the ID "XXX" to the client server 70, and thereafter the client 70 transmits a request packet of the ID "yyy" to the server 80.

The transfer device 200, when receiving the request packet of the ID "xxx" from the client 70, transmits a predicted packet of the ID "yyy" to the server 80 in advance based on the above transmission pattern.

The following describes the other processing (2) of the transfer device 200. The transfer device 200 may add various statistical information to transmission patterns in the dynamic sequence table 245. For example, the statistical information includes the number of reproduction times and information of the reproduced client. The number of reproduction times indicates the number of times that the ID of the request packet hits the transmission pattern. The reproduced client is information indicating the client which is a transmission source of the request packet when the ID of the request packet hits the transmission pattern. When a plurality of clients exist, the transfer device 200 generates a pattern for every client.

The registration unit 251 of the transfer device 200 may delete a transmission pattern of a small number of reproduction times based on statistical information of the transmission pattern. For example, when the incremental number of reproduction times after elapse of a predetermined time from generation of the transmission pattern is less than a predetermined number of times, the transfer device 200 deletes a transmission pattern having the incremental number of times less than a predetermined number of times.

The following describes the other processing (3) of the transfer device 200. When a request packet received from the client 70 is a request packet for viewing a plurality of files, the transfer device 200 may transmit a plurality of subsequent packets transmitted for viewing the files to the server 80 in advance.

For example, in the case where the packet requests viewing of files A, B, C, the transfer device 200 transmits a subsequent predicted packet transmitted for viewing the file A, a subsequent predicted packet transmitted for viewing the file B, and a subsequent packet transmitted for viewing the file C in advance respectively. The subsequent predicted packet is generated based on the dynamic sequence table 245 in the same manner as transfer devices 100, 200 described above.

Figure 15:
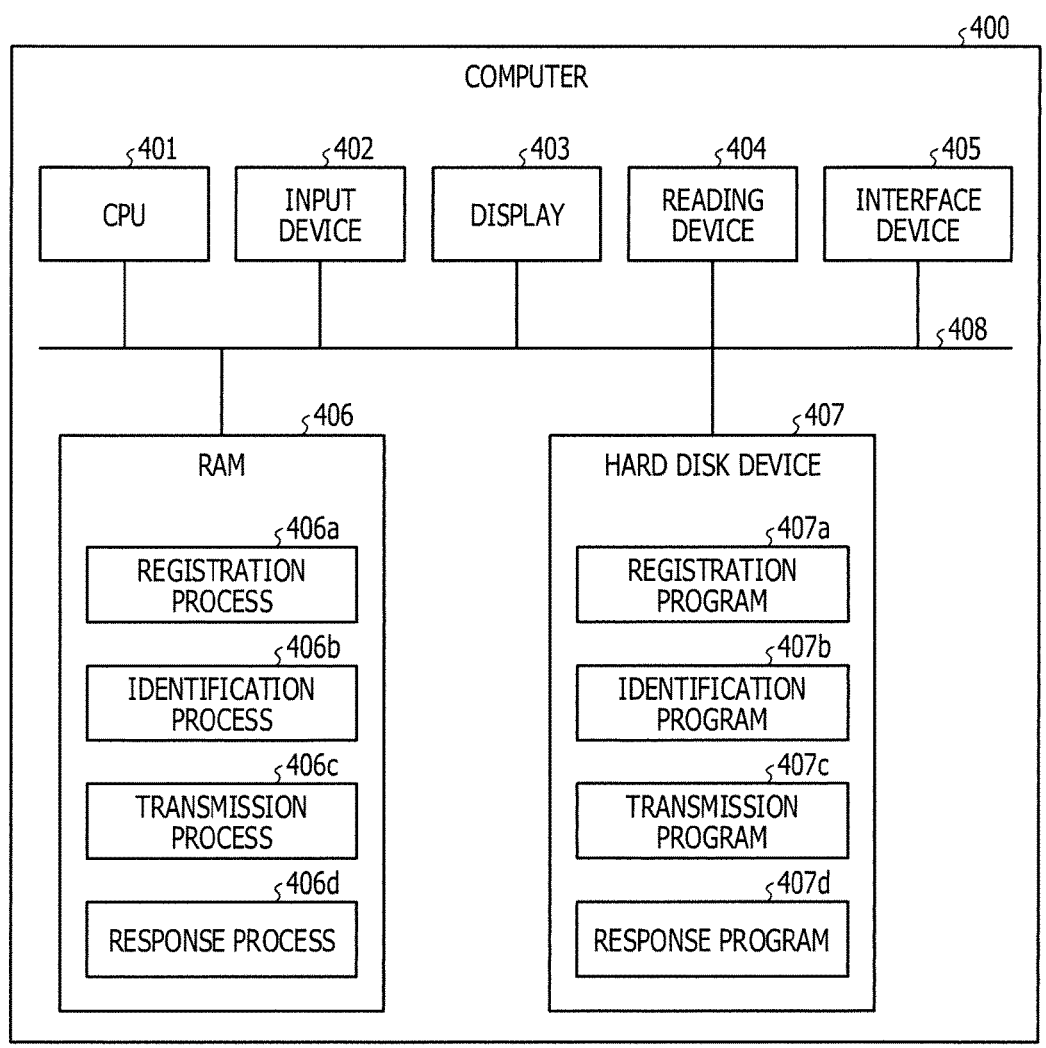
FIG. 15 illustrates an example of a computer executing a transfer program.
Figure 16:
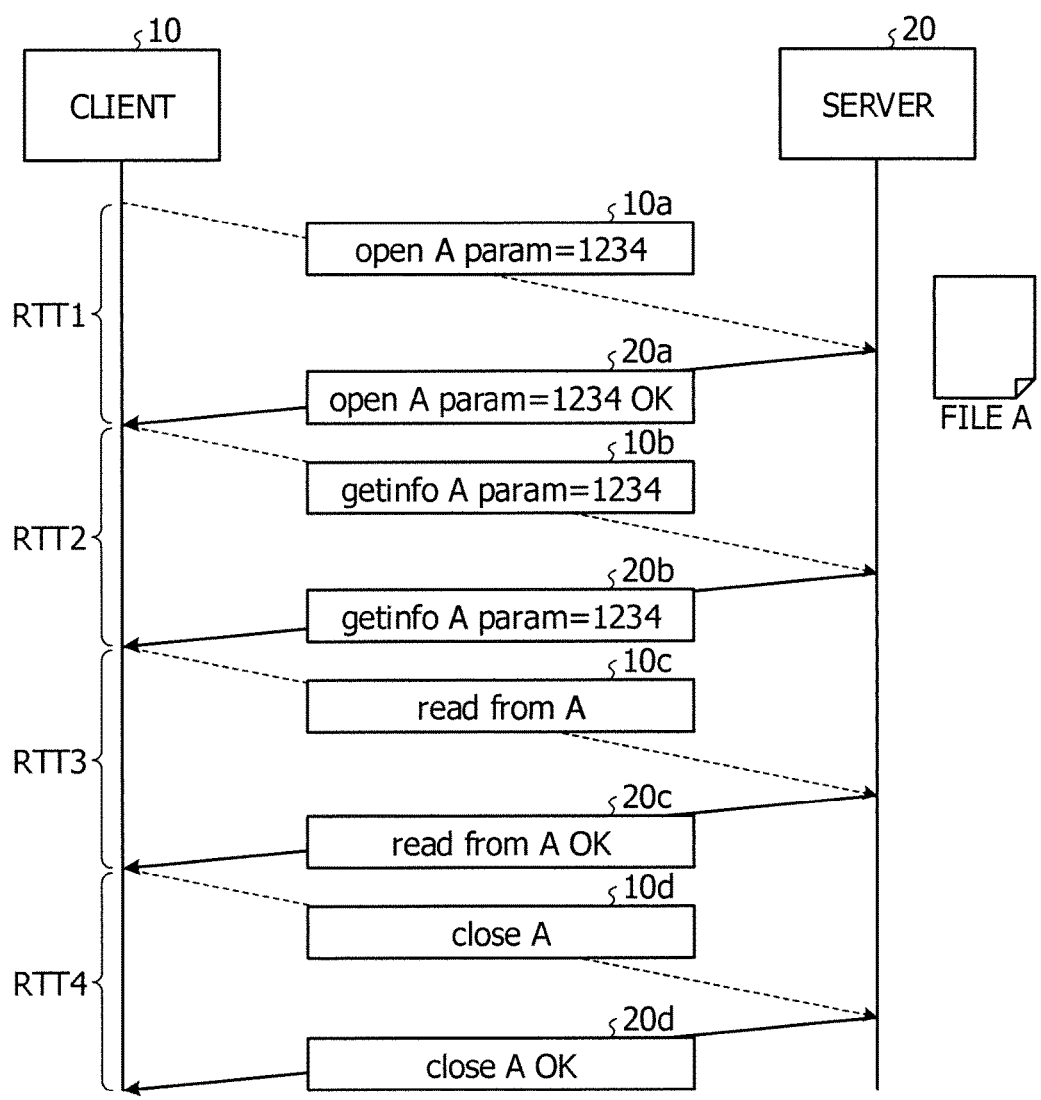
FIG. 16 is a diagram for illustrating Related Technique 1.
Figure 17:
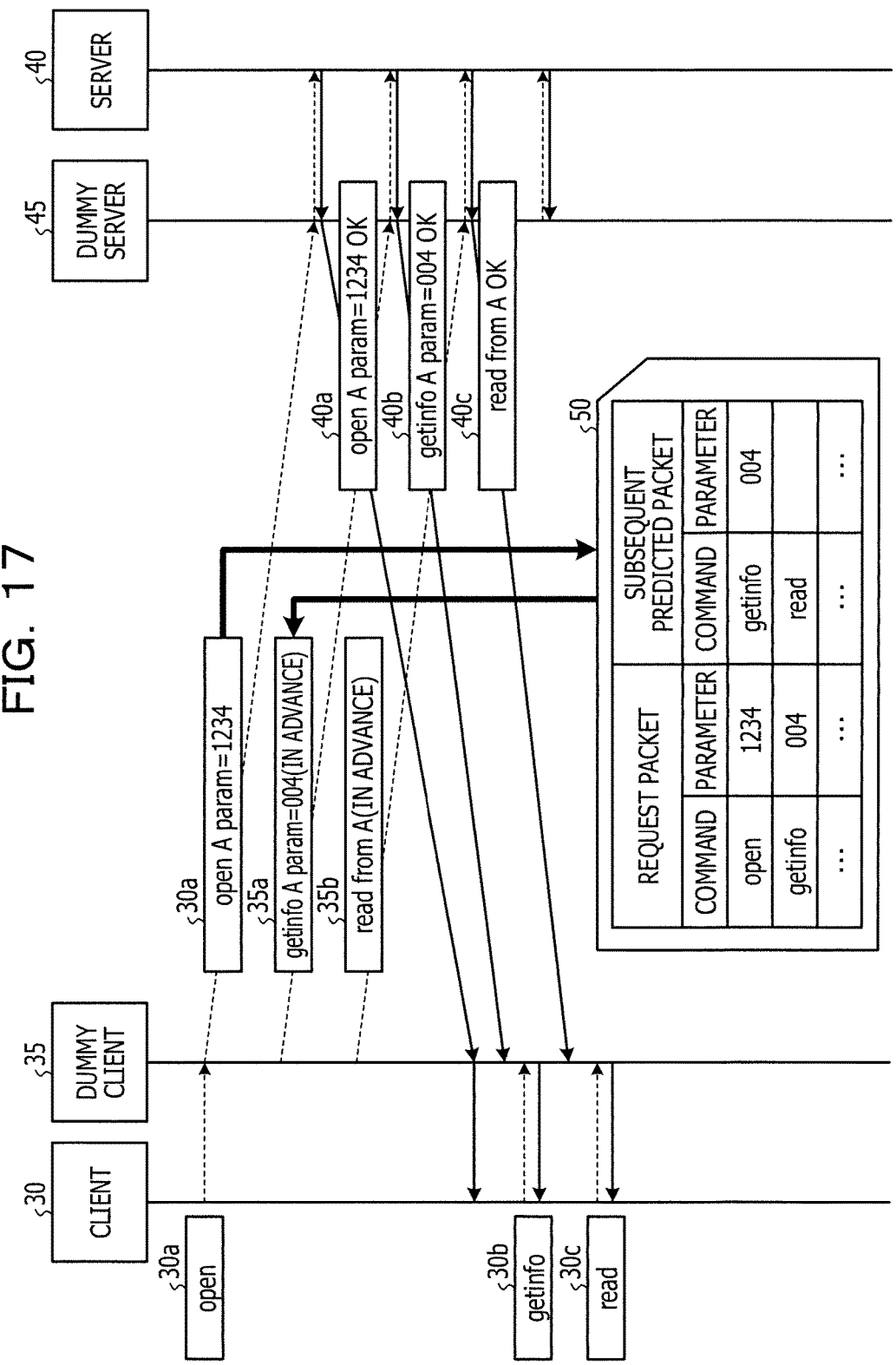
FIG. 17 is a diagram for illustrating Related Technique 2.

Next, an example of a computer executing a display program which implements same functions as transfer devices 100, 200, 300 illustrated in the above embodiments is described. FIG. 15 illustrates an example of a computer executing a transfer program.

As illustrated in FIG. 15, a computer 400 includes a CPU 401 configured to execute various arithmetic operations, an input device 402 configured to receive input of data from the user, and a display 403. The computer 400 also includes a reading device 404 configured to read programs from a storage medium and an interface device 405 configured to exchange data with other computers via a network. The computer 400 also includes a RAM 406 configured to temporarily store various information and a hard disk device 407. Then, devices 401 to 407 are coupled to a bus 408.

The hard disk device 407 includes a registration program 407a, an identification program 407b, a transmission program 407c, and a response program 407d. The CPU 401 reads the registration program 407a, the identification program 407b, the transmission program 407c, and the response program 407d and decompresses into the RAM 406. The registration program 407a functions as a registration process 406a. The identification program 407b functions as an identification process 406b. The transmission program 407c functions as a transmission process 406c. The response program 407d functions as a response process 406d.

The registration process 406a corresponds to processing of registration units 151, 251. The identification process 406b corresponds to processing of identification units 152, 252. The transmission process 406c corresponds to processing of transmission units 153, 253. The response process 406d corresponds to the response unit 154, the response table generation unit 254, and the proxy response unit 352.

The registration program 407a, the identification program 407b, the transmission program 407c, and the response program 407d may not be stored in the hard disk device 407 from the beginning. For example, the programs may be stored in a "portable physical medium" including a flexible disk (FD), a CD-ROM, a DVD disk, an optical magnetic disk, and an IC card, which are inserted into the computer 400. Then, the computer 400 may be configured to read and execute programs 407a to 407d.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transfer device comprising:
    a memory; and
    a processor coupled to the memory and the processor configured to:
        when a plurality of packets are received from a client apparatus, register each of identifiers uniquely identifying each of the plurality of packets into sequence information in a reception order of the plurality of packets;
        when a first packet is received from the client apparatus, transmit the first packet to a destination apparatus
            specify a second identifier of a second packet next to the first packet by comparing a first identifier of the received first packet and an order of the identifiers registered in the sequence information; and
        transmit the second packet corresponding to the specified second identifier to the destination apparatus.

2. The transfer device according to claim 1, wherein each of the identifiers is registered in association with data to be used for generating each of the plurality of packets, and
    the second packet is generated by using registered data associated with the second identifier.

3. The transfer device according to claim 1, wherein each of the identifiers is generated on the basis of a non-dependent parameter out of a dependent parameter depending on a file requested by the client apparatus and the non-dependent parameter not depending on the file, the dependent parameter and the non-dependent parameter being separated from a command included in each of the plurality of packets.

4. The transfer device according to claim 3, wherein the second packet corresponding to the second identifier is generated by a combination of a non-dependent parameter associated with the second identifier and a dependent parameter associated with the first packet.

5. The transfer device according to claim 1, the processor further configured to:
    when receiving a first response packet relative to the first packet from the destination apparatus, store the first packet and the first response packet in association with each other into response information; and
    when receiving a third packet from the client apparatus, specify a second response packet associated with the third packet by referring to the response information and transmit the second response packet to the client apparatus without transmitting the third packet to the destination apparatus.

6. A transfer method executed by a computer, the transfer method comprising:
    when a plurality of packets are received from a client apparatus, registering each of identifiers uniquely identifying each of the plurality of packets into sequence information in a reception order of the plurality of packets;
    when a first packet is received from the client apparatus, transmitting the first packet to a destination apparatus;
    specifying a second identifier of a second packet next to the first packet by comparing a first identifier of the received first packet and an order of the identifiers registered in the sequence information; and
    transmitting the second packet corresponding to the second identifier to the destination apparatus.

7. The transfer method according to claim 6, wherein each of the identifiers is registered in association with data to be used for generating each of the plurality of packets, and
    the second packet is generated by using registered data associated with the second identifier.

8. The transfer method according to claim 6, wherein each of the identifiers is generated on the basis of a non-dependent parameter out of a dependent parameter depending on a file requested by the client apparatus and the non-dependent parameter not depending on the file, the dependent parameter and the non-dependent parameter being separated from a command included in each of the plurality of packets.

9. The transfer method according to claim 8, wherein the second packet corresponding to the second identifier is generated by a combination of a non-dependent parameter associated with the second identifier and a dependent parameter associated with the first packet.

10. The transfer method according to claim 6, further comprising:
    when receiving a first response packet relative to the first packet from the destination apparatus, storing the first packet and the first response packet in association with each other into response information; and
    when receiving a third packet from the client apparatus, specifying a second response packet associated with the third packet by referring to the response information and transmitting the second response packet to the client apparatus without transmitting the third packet to the destination apparatus.

11. A transfer system comprising:
    a first transfer device including:
        a first memory; and
        a first processor coupled to the first memory and the first processor configured to:
            when a plurality of packets are received from a client apparatus, register each of identifiers uniquely identifying each of the plurality of packets into sequence information in a reception order of the plurality of packets,
            when a first packet is received from the client apparatus, transmit the first packet to a destination apparatus and specify first identifier of a second packet next to the first packet in accordance with an order of the identifier registered in the sequence information, and transmit the second packet corresponding to the first identifier to the destination apparatus, when receiving a first response packet relative to the first packet from the destination apparatus, store the first packet and the first response packet in association with each other into response information, and transmit the response information, and a second transfer device including:

a second memory; and a second processor coupled to the second memory and the second processor configured to:

receive the response information from the first transfer device, when a second packet is received from the client apparatus, specify a second response packet in accordance with the second packet and the response information, and transmit the second response packet to the client apparatus instead of the destination apparatus.

12. The transfer system according to claim 11, wherein each of the identifiers is registered in association with data to be used for generating each of the plurality of packets, and the second packet is generated by using first registered data associated with the first identifier.

13. The transfer system according to claim 11, wherein each of the identifiers is generated on the basis of a non-dependent parameter out of a dependent parameter depending on a file requested by the client apparatus and the non-dependent parameter not depending on the file, the dependent parameter and the non-dependent parameter being separated from a command included in each of the plurality of packets.

14. The transfer system according to claim 13, wherein the packet corresponding to the first identifier is generated by a combination of a non-dependent parameter associated with the first identifier and a dependent parameter associated with the first packet.

15. The transfer system according to claim 11, the processor further configured to, when receiving a third packet from the client apparatus, specify a third response packet associated with the third packet by referring to the response information and transmit the third response packet to the client apparatus without transmitting the third packet to the destination apparatus.

* * * * *